United States Patent
Hewitt et al.

(10) Patent No.: US 11,321,533 B2
(45) Date of Patent: *May 3, 2022

(54) COGNITIVE COPY AND PASTE

(71) Applicant: International Business Machines Corporation, Armonk, NY (US)

(72) Inventors: Trudy L. Hewitt, Cary, NC (US); Jonathan Dunne, Dungarvan (IE); Kelley Anders, East New Market, MD (US); Robert Grant, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/790,213

(22) Filed: Feb. 13, 2020

(65) Prior Publication Data

US 2020/0184154 A1 Jun. 11, 2020

Related U.S. Application Data

(63) Continuation of application No. 15/800,949, filed on Nov. 1, 2017, now Pat. No. 10,599,772.

(51) Int. Cl.
*G06F 17/24* (2006.01)
*G06F 40/30* (2020.01)
(Continued)

(52) U.S. Cl.
CPC .............. *G06F 40/30* (2020.01); *G06F 9/543* (2013.01); *G06F 40/16* (2020.01); *G06F 40/166* (2020.01);
(Continued)

(58) Field of Classification Search
None
See application file for complete search history.

(56) References Cited

U.S. PATENT DOCUMENTS 7,315,826 B1 * 1/2008 Guheen .............. G06Q 30/0201
  705/7.29
7,496,230 B2 * 2/2009 Chen ...................... G06F 9/543
  715/265

(Continued)

FOREIGN PATENT DOCUMENTS

CN  103139244 A  6/2013

OTHER PUBLICATIONS

Morgan et al., "The 'copy and paste' function: A flawed cognitive tool in need of redesign", Proceedings of the 23rd annual ascilite conference: Who's learning Whose technology?, Dec. 3-6, 2006, University of Sydney, vol. 2.

(Continued)

*Primary Examiner* — Seong-Ah A Shin
(74) *Attorney, Agent, or Firm* — Scully, Scott, Murphy & Presser, PC; Alexander Jochym, Esq.

(57) ABSTRACT

A system, method and computer program product for cognitive copy and paste. The method includes: receiving, at a hardware processor of a computer system, an input representing a selection of a content captured from a source application program, and receiving an input representing an identified target application program that will receive the selected content to be copied and rendered in the target application program. The selected content is analyzed to determine a context for the selected content; and a rendering of the selected content at a location within the destination application based on the determined context, the rendering achieving a best representation of the selected content on the destination application. The analyzing includes invoking a natural language processor to determine an intent, meaning, or an intended use of the selected content based on the determined context, and employs a support vector machine for determining a best format change when rendering.

20 Claims, 7 Drawing Sheets

(51) Int. Cl.
*G06F 9/54* (2006.01)
*G06N 5/02* (2006.01)
*G06F 40/16* (2020.01)
*G06F 40/166* (2020.01)
*G06F 40/216* (2020.01)
*G06F 40/134* (2020.01)

(52) U.S. Cl.
CPC ............ *G06F 40/216* (2020.01); *G06N 5/02* (2013.01); *G06F 40/134* (2020.01)

(56) References Cited

U.S. PATENT DOCUMENTS

| | | | |
|---|---|---|---|
| 8,924,858 B2 | 12/2014 | Mistry et al. | |
| 9,104,750 B1* | 8/2015 | Dhamdhere | ........ G06F 16/3322 |
| 9,401,881 B2 | 7/2016 | Isensee et al. | |
| 9,456,229 B2 | 9/2016 | Anders et al. | |
| 2009/0119283 A1* | 5/2009 | Muehlbauer | .......... G06F 16/951 |
| | | | 707/999.005 |
| 2012/0259722 A1* | 10/2012 | Mikurak | ............ G06Q 30/0261 |
| | | | 705/26.1 |
| 2014/0075004 A1* | 3/2014 | Van Dusen | ........ G06Q 30/0201 |
| | | | 709/223 |
| 2014/0157168 A1* | 6/2014 | Albouyeh | ................ G06F 9/451 |
| | | | 715/770 |
| 2015/0088998 A1* | 3/2015 | Isensee | ................. G06F 40/279 |
| | | | 709/206 |
| 2015/0234800 A1* | 8/2015 | Ehlen | ....................... G06F 16/70 |
| | | | 715/202 |
| 2016/0260341 A1 | 9/2016 | Baughman et al. | |
| 2017/0038856 A1* | 2/2017 | Missig | ................. G06F 3/04883 |
| 2017/0039326 A1* | 2/2017 | Stankiewicz | ........ G06Q 10/063 |
| 2017/0083586 A1* | 3/2017 | Huang | .................... G06F 40/30 |
| 2017/0235848 A1* | 8/2017 | Van Dusen | ............ G06N 20/00 |
| | | | 705/12 |
| 2019/0129939 A1 | 5/2019 | Hewitt et al. | |
| 2019/0129940 A1 | 5/2019 | Hewitt et al. | |

OTHER PUBLICATIONS

Esser et al., "Cognitive Computing Systems: Algorithms and Applications for Networks of Neurosynaptic Cores", IBM Corporation; IBM Research Almaden; 2013.

Anonymously, "Safer Copy & Paste System", IP.com Prior Art Database Technical Disclosure, IPCOM000239576D, Nov. 17, 2014, http://ip.com/IPCOM000239576D.

Anonymously, "Method and System to Copy and Paste Complex Content Data in Composite User Interface(UI) Layout", IP.com Prior Art Database Technical Disclosure, IPCOM000227652D, May 10, 2013, http://ip.com/IPCOM000227652D.

Anonymously, "A Method and System for Indicating a Paste Destination Prior to Copying Content to be Placed in a Clipboard", IP.com Prior Art Database Technical Disclosure, IPCOM000226642D, Apr. 21, 2013, http://ip.com/IPCOM000226642D.

Anonymously, "A Method of Improving Copy-Paste Functionality by Introducing Content-Awareness", IP.com Prior Art Database Technical Disclosure, IPCOM000216905D, Apr. 23, 2012, http://ip.com/IPCOM000216905D.

IBM, "Method and System to Paste then Copy", IP.com Prior Art Database Technical Disclosure, IPCOM000177579D, Dec. 18, 2008, http://ip.com/IPCOM000177579D.

IBM, "System, Apparatus and Provision to Transfer Content from an Application to Another Application or File, with Preview and Preferences", IP.com Prior Art Database Technical Disclosure, IPCOM000173659D, Aug. 20, 2008, http://ip.com/IPCOM000173659D.

IBM, "Method and System for Context Sensitive Copy Among Different Computers", IP.com Prior Art Database Technical Disclosure, IPCOM000176118D, Nov. 6, 2008, http://ip.com/IPCOM000176118D.

List of IBM Patents or Patent Applications Treated as Related.

* cited by examiner

COGNITIVE COPY AND PASTE

FIELD

Embodiments of the present invention generally relate to computer system functionality for copying and pasting content (e.g., text) between two (or more) different software applications, and more specifically, to a cognitive method and system for providing copy and paste functions.

BACKGROUND

Copy and paste are a very important and commonly used functionality that computers offer. Unfortunately however, it can be difficult to ensure that the paste turns out as desired in the target input. An example scenario is illustrative where a user attempts to copy and paste content from an originating source application, e.g., Microsoft Excel®, into a target application, e.g., IBM Lotus® Connections. The pasting in the target application does not keep its format from the originating source and there is a marked decrease in quality such that the content is not in any form presentable for use in the intended target application.

However, in this scenario, it has been found if a user first copies and pastes the content from the originating source application MS Excel® into word a further program first, e.g., Microsoft WORD®, and then from the MS WORD® application into the IBM Lotus® Connections, the formatting is preserved and there is no decrease in quality.

In a similar scenario, it has been found that the same thing can happen with some links/URLs embedded in content selected for a paste operation. For example, if these links/URLs are pasted into an e-mail program, they will not work and are rendered inoperable because of the presence of spaces; however, if the link or URL is first pasted into a chat window first, that chat application fixes the spaces (e.g., by adding % instead of spaces). These links or URLs may then be copied from the chat window and then pasted from chat into the e-mail program where they are rendered operable.

SUMMARY

A system, method and computer program product is provided that performs cognitive monitoring when using copy and paste functions in order to optimize the output format to ensure that it meets the desired format based on the content tooling. Furthermore, the cognitive copy and paste considers the utility of the applications, the context of the copied content, and surrounding content.

In one aspect, the system and methods employed provides a solution that: 1) can alter the content to the desired use (e.g., links vs. text); and 2) can alter the content respective to the desired target application/program.

According to one aspect of the present invention, there is provided a computer-implemented method for cognitive copy and paste. The method includes: receiving, at a hardware processor of a computer system, an input representing a user selection of a content captured from a source application program running on the computer system; receiving, at the hardware processor, a second input representing an identified target application program that will receive the selected content to be copied and rendered in the target application program; analyzing, by the processor device, the selected content; determining, by the processor device, a context for the selected content; and rendering, by the hardware processor, the selected content at a location within the destination application based on the determined context, the rendering to achieve a best representation of the selected content on the destination application.

In another aspect of the present invention, there is provided a computer-implemented cognitive content copy and paste system. The system includes: a memory storage device; and a hardware processor coupled to the memory storage device and configured to perform a method to: receive an input representing a user selection of a content captured from a source application program running on a computer system; receive a second input representing an identified target application program that will receive the selected content to be copied and rendered in the target application program; analyze the selected content to determine a context for the selected content; render the selected content at a location within the destination application based on the determined context, the rendering achieving a best representation of the selected content on the destination application.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In one aspect, a system and method are provided to leverage cognitive monitoring when using copy and paste (copy-paste) or cut and paste (cut-paste) to optimize the output format to ensure that the content to be moved meets the desired format based on the content tooling. Furthermore, the cognitive copy and paste operations consider the utility of the applications, the context of the copied content, and surrounding content.

Figure 1:
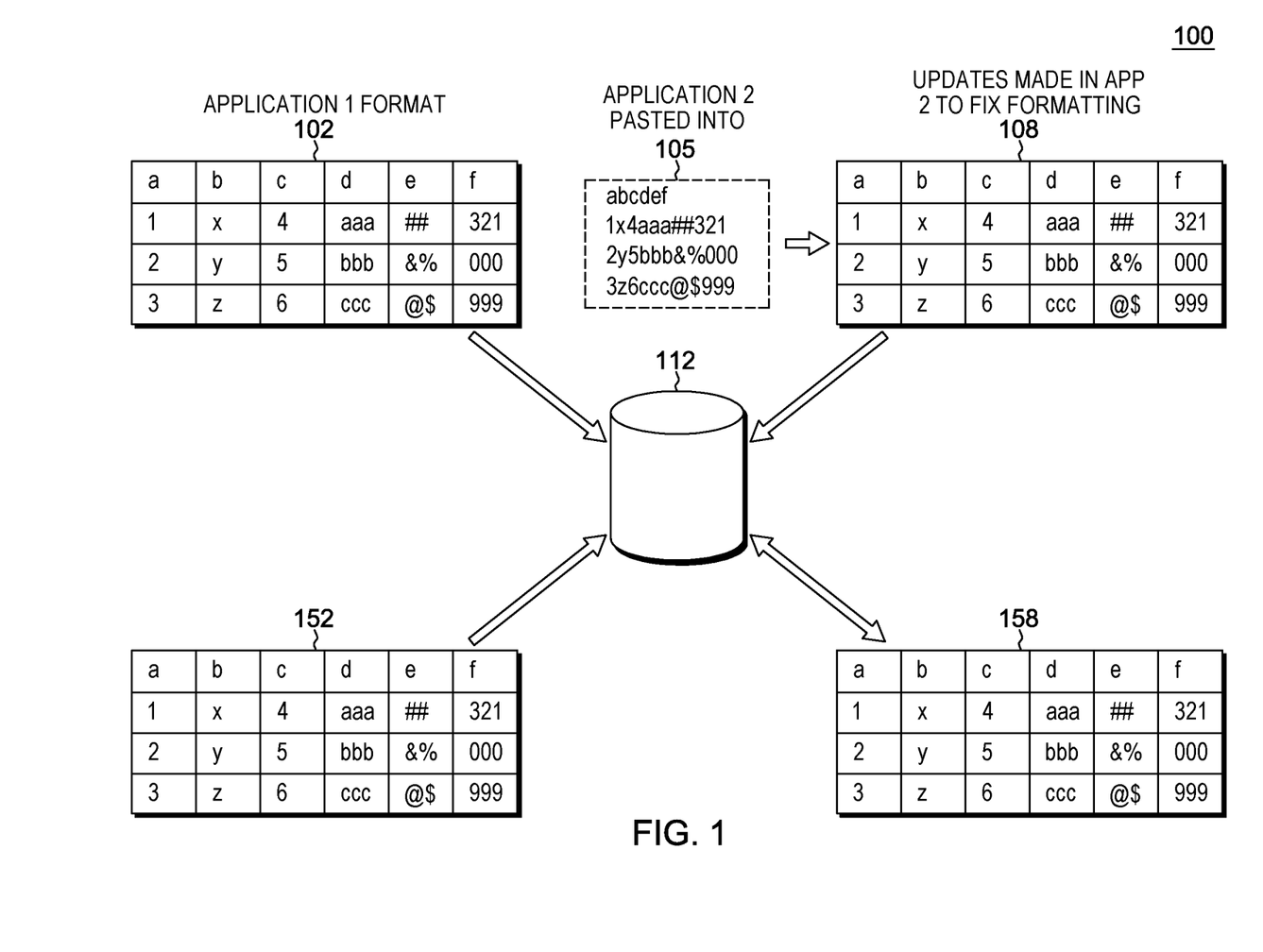
FIG. 1 depicts an example workflow diagram reflecting use of the cognitive copy/paste monitoring system in one embodiment.

FIG. 1 depicts an example workflow diagram 100 reflecting use of the cognitive monitoring system in one embodiment. The cognitive monitoring system may be employed at any computer environment and leverages cognitive functionality, e.g., such as may be provided by Watson® and work at the application level or operating system level. That is, the cognitive monitoring system operatively interacts with the typical copy-paste or cut-paste operations that are supported by clipboard functions provided by the computer system's operating system. These functions are all based on two features: a) a dedicated storage area providing temporary buffer for data, and b) support for several formats. For example, using conventional clipboard memory, a sequence of operations to perform such copy-paste or cut-paste operations include, but are not limited to: selecting the source object to be pasted; copy or cut the source object; move to the destination environment/tool; place the insertion point at the right place; and paste the source object, possibly with some specific options.

As shown in FIG. 1, the computer system employing the cognitive monitoring system functionality runs an office tool embodied as a software application such as: a typical presentation editor, text editor, an electronic spreadsheet, organizers, mail tools, etc. An example first application running on the computer system (App 1), e.g., a text editor, presents an example display 102 in the form of a table having columns and rows of values. In one embodiment, the cognitive monitoring system captures the application (App 1) meta-data and surrounding context. As will be described in further detail, the captured meta-data and surrounding context is added to a Support Vector Machine (SVM) supervised learning algorithm for use as training data. At 105, using a copy and paste function from the App 1, there is shown the results of a user copying the table from the App 1 display and pasting the table into a second (target) application (App 2) running on the system (or another computer system). The cognitive monitoring system captures the copied data and stores the data in a local system memory, e.g., a database 112. As shown at 105, the presented table shows a fidelity loss, i.e., the pasted table results in an undesirable formatting.

The user presented with the undesired pasted object, i.e., the unformatted table, invokes functionality provided in the second application (App 2) to reformat and update the table by making the required format changes at 108. The cognitive monitoring system captures each of the update operations conducted via the second application App 2 to fix the formatting of object copied from the App 1 and saves the data captured from the updated formatting in a database 112. Additionally, the captured update data may be further added to the SVM learning algorithm for use as training data.

Then, as shown at 152, in a later copy application performed between the same two systems/applications, e.g., in which a content formatted in App 1 at 152 is to be pasted into the App2, the SVM model is invoked to ensure that the formatting alteration saved to the database 112 is automatically replicated for the content to be pasted into the App 2 at 158. That is, as the paste application is being performed, the SVM will invoke a method to find the matching information including performing the formatting operations that will appropriately format the content for pasting into the App 2.

In this example implementation, as the user copies content from App 1 at 108 and pastes it into target App 2 at 158, the SVM will attempt to make the required alterations when sufficient data has been collected. Thus, for example, if the user is required to make additional changes to achieve the required formatting in App 2, these additional operations will be captured and ingested by the SVM.

Thus, in view of the example implementation shown FIG. 1, a computing system leverages a cognitive monitoring program when using copy and paste to optimize the output format to ensure that it meets the desired format based on the content tooling. In one embodiment, the cognitive copy and paste system considers the utility of the applications, the context of the copied content, and surrounding content. Based on Natural Language Understanding, i.e., by employing natural language processing techniques, the system derives the intent of the content (e.g., text) and paired with the application utility, derive how it might be intended to be used (i.e., understand what the intention of the copy/paste event is for so it could be cognitively assisted for programming). This would allow further refinement of the pasted content and possibly complete alteration of the text.

In an embodiment, previous copy and pasting operations with formatting changes (operations) are further analyzed along with the applications they were copied to and pasted from. Over the time, the system is able to associate certain formats for particular uses and generate the desired formatting changes automatically or dynamically based on context. Thus, for example, if the user opens a third target application (e.g., App 3) which has a similar utility to App 2, then the user may pastes the text from App 1 into App 3 with the same alterations being applied to the text (as would be applied if the text was copied into App 2). As the user continues to use the monitoring system, the changes they have to make are captured to ensure that the copy paste translates across applications.

In a further embodiment, the cognitive copy and paste monitoring system may further detect if the formatting differs from the originating source. For example, the system may determine that the formatting can not be preserved when directly pasting content from the source application/tool to the targeted location/tool. If the formatting can not be preserved from directly pasting from source to the targeted location/tool, the system will dynamically determine if there is "pass-thru" tool or application that could be leveraged for preserving the formatting.

Figure 2:
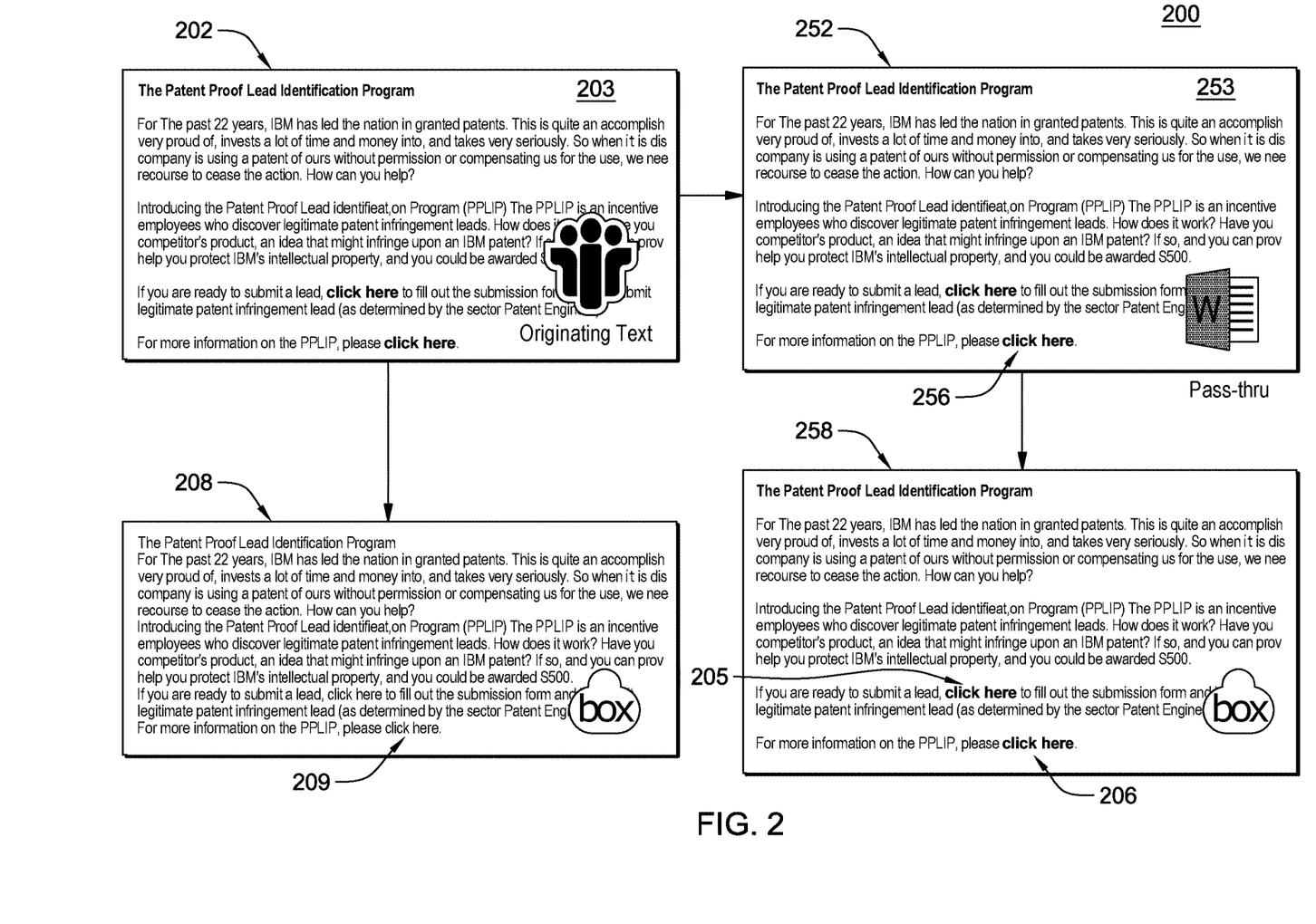
FIG. 2 depicts a further example workflow diagram reflecting a further application of the cognitive monitoring system in one embodiment.

FIG. 2 depicts a further example workflow diagram 200 reflecting a further application of the cognitive monitoring system in one embodiment. As shown in FIG. 2, an originating source application 202, for example, text from an IBM® Notes® e-mail contains formatted text 203 (e.g., separated paragraphs) and including hyperlinks 205, 206. It is found that when pasting the text directly from the email program 202 to a file created in a second program 208, e.g., a file sharing/collaboration application such as an application running at "Box.com," the paragraph formatting and hyperlinks are lost 209.

However, in the further cognitive copy and paste embodiment, the system will dynamically determine existence of a "pass-thru" tool or application 252 that could be leveraged for preserving the formatting. For example, the system determines that by first pasting the content 203 from the Notes® application to a Microsoft®Word® text editing application, the paragraph formatting 253 and hyperlinks 256 are preserved. The system then automatically pastes the copied content from the pass-thru Word® text editing application 252 to the opened file 258 in the target file sharing/collaboration application ("Box.com") which appears to achieve preserving of the original formatting including presence of hyperlinks 205, 206.

Figure 3:
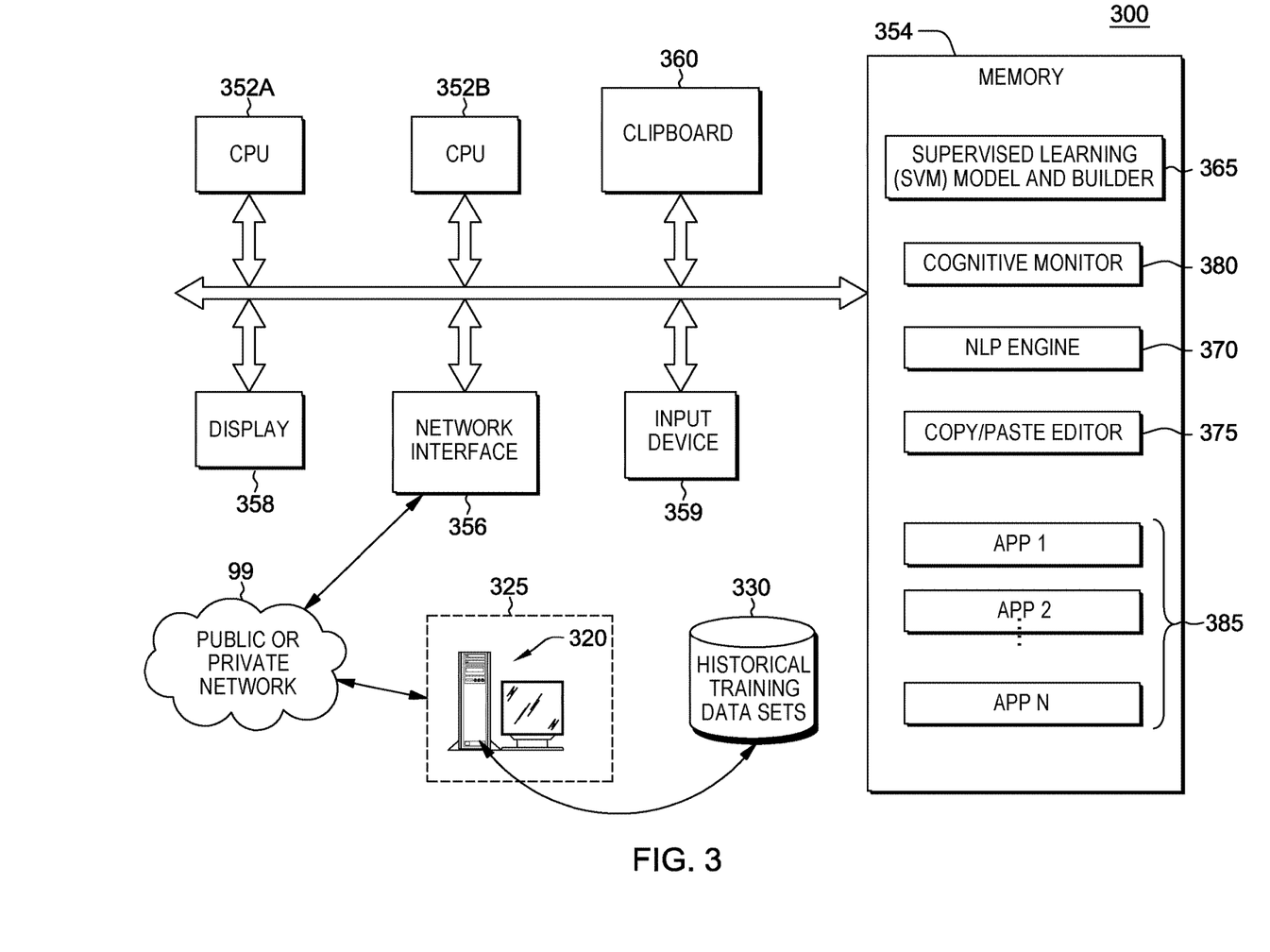
FIG. 3 shows a schematic block diagram of a computer system configured for cognitive copy/paste monitoring according to embodiment described herein.

Referring now to FIG. 3, there is depicted a computer system 300 providing the ability for cognitive copy and paste. In some aspects, system 300 may include a computing device, a mobile device, or a server. In some aspects, computing device 300 may include, for example, personal computers, laptops, tablets, smart devices, smart phones, or any other similar computing device.

Computing system 300 includes one or more hardware processors 352A, 352B, a memory 354, e.g., for storing an operating system and program instructions, a network interface 356, a display device 358, an input device 359, and any other features common to a computing device. In some aspects, computing system 300 may, for example, be any computing device that is configured to communicate with a web-site 325 or web- or cloud-based server 320 over a public or private communications network 99. Further, as shown as part of system 300, historical data sets including training data that includes formatting operations that system captures when users perform conversions of content between programs may stored locally in an attached memory storage device 360, e.g., a clipboard memory, or stored in an attached, or a remote memory storage device 330, e.g., a database, and accessed via a remote network connection for input to the system 300.

In the embodiment depicted in FIG. 3, processors 352A, 352B may include, for example, a microcontroller, Field Programmable Gate Array (FPGA), or any other processor that is configured to perform various operations. Processors 352A, 352B may be configured to execute instructions as described below. These instructions may be stored, for example, as programmed modules in memory storage device 354.

Memory 354 may include, for example, non-transitory computer readable media in the form of volatile memory, such as random access memory (RAM) and/or cache memory or others. Memory 354 may include, for example, other removable/non-removable, volatile/non-volatile storage media. By way of non-limiting examples only, memory 354 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 356 is configured to transmit and receive data or information to and from a web-site server 320, e.g., via wired or wireless connections. For example, network interface 356 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 300 to transmit information to or receive information from the server 320.

Display 358 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 358 may include a liquid crystal display (LCD), an e-paper/e-ink display, an organic LED (OLED) display, or other similar display technologies. In some aspects, display 358 may be touch-sensitive and may also function as an input device.

Input device 359 may include, for example, a keyboard, a mouse, a touch-sensitive display, a keypad, a microphone, or other similar input devices or any other input devices that may be used alone or together to provide a user with the capability to interact with the computing device 300.

With respect to the ability of computer system 300 for performing cognitive copy-paste or cut-paste, the system 300 further includes: a memory 360 configured for storing historical data sets and other input output data sets that are used to train and generate the SVM (support vector machine) used for the cognition. In one embodiment, this database 360 may be local to the computer or mobile device system 300, or otherwise, such database 360 may be associated with the remote server 320, over a network.

In one embodiment, the system 300 is a 'cognitive computing system' and provides a technology platform employing artificial intelligence and signal processing. The platform at least encompasses machine learning, reasoning, natural language processing, speech and vision, and human-computer interaction. The programmed processing modules stored in a device memory 354 thus provide the system with abilities for cognitive copy and paste based on received sets of input data.

Thus, as shown in FIG. 3, one program module stored in a device memory 354 may include a cognitive monitor module 380 providing instructions for conducting the monitoring and execution of copy/cut and paste operations between applications. For example, such a copy/paste editor 375 may be provided at an operating system level or application level and may be associated with any one or more of the software applications 385, e.g., App 1, App 2, . . . , App N, each running on the system that may source or receive formatted content via editing operations within the system, or between the system 300 and other remote systems. Such applications provided at the computer system 300 may include user office tools embodied as software applications such as: presentation editors, electronic spreadsheets, text editors, organizers, mail tools, etc.

In a further embodiment, a supervised learning module 365 is further provided to invoke instructions for running supervised learning techniques including the implementation of a learning algorithm for building an SVM model. Such functionality may include implementing functions for receiving and ingesting meta-data corresponding to user formatting techniques when conducting copy-paste or cut-paste operations between one or more of the software application 380, and for inputting the training data including captured meta-data and surrounding context into the supervised learning algorithm for use in building the SVM model.

In one embodiment, a natural language (NPL) processing engine 370 for use in cognitive copy and find operations is provided. By invoking Natural Language Processing engine 370, methods are run that can derive the intent of the content to be copied/cut (e.g., text), and paired with the application utility, can derive how it might be intended to be used. This would allow further refinement of the pasted content and possibly complete alteration of the text.

Thus, in one aspect, a users' previous cut/copy and pasting operations with formatting changes could be stored and analyzed along with the applications they were copied to and pasted from. Over the time, the system learns to associate certain formats for particular uses and generate the desired formatting changes automatically or dynamically based on context. Models such as the SVM along with supervised learning, could easily allow these copy paste techniques to be implemented.

In one embodiment, mechanisms such as APIs (application programming interfaces), web-services, etc. are employed to provide the various data and processing instructions used for Support Vector Machine learning and subsequent cognitive copy/paste operations as performed by the processing modules via the processor(s) 352A, 352B.

FIGS. 4A-4F depict a method run at a computer system for performing cognitive copy-paste/cut-paste operations according to one embodiment. At 402, the cognitive monitor performs a first step of detecting a copy event, where an input is received identifying a content rendered by a first source application program to be copied/cut. The content may include text content and formatted entities such as tables, charts, formats, and hyperlinks, e.g., Uniform Resource Locators (URLs). Then at 405, the monitor invokes steps for determining a user context for the identified portion of content by analyzing the content, e.g., copying a table or URLs embedded in text. In one embodiment, operations are performed seamless to the user that include invoking a NLP processing engine 370 to determine an intent (e.g., an intended meaning) of the copied/cut content using a natural language processing technique, e.g., when the content is textual. There may be further determined a current intended use of the content based on the determined context and the determined intent of the content. As another example, the target or destination application may be detected that based on the intent, intended use, a time of day, a type of device running the applications, e.g., based on another application already opened and running on the user's computer device (e.g., a device "context") the user typically works with.

Figure 4A:
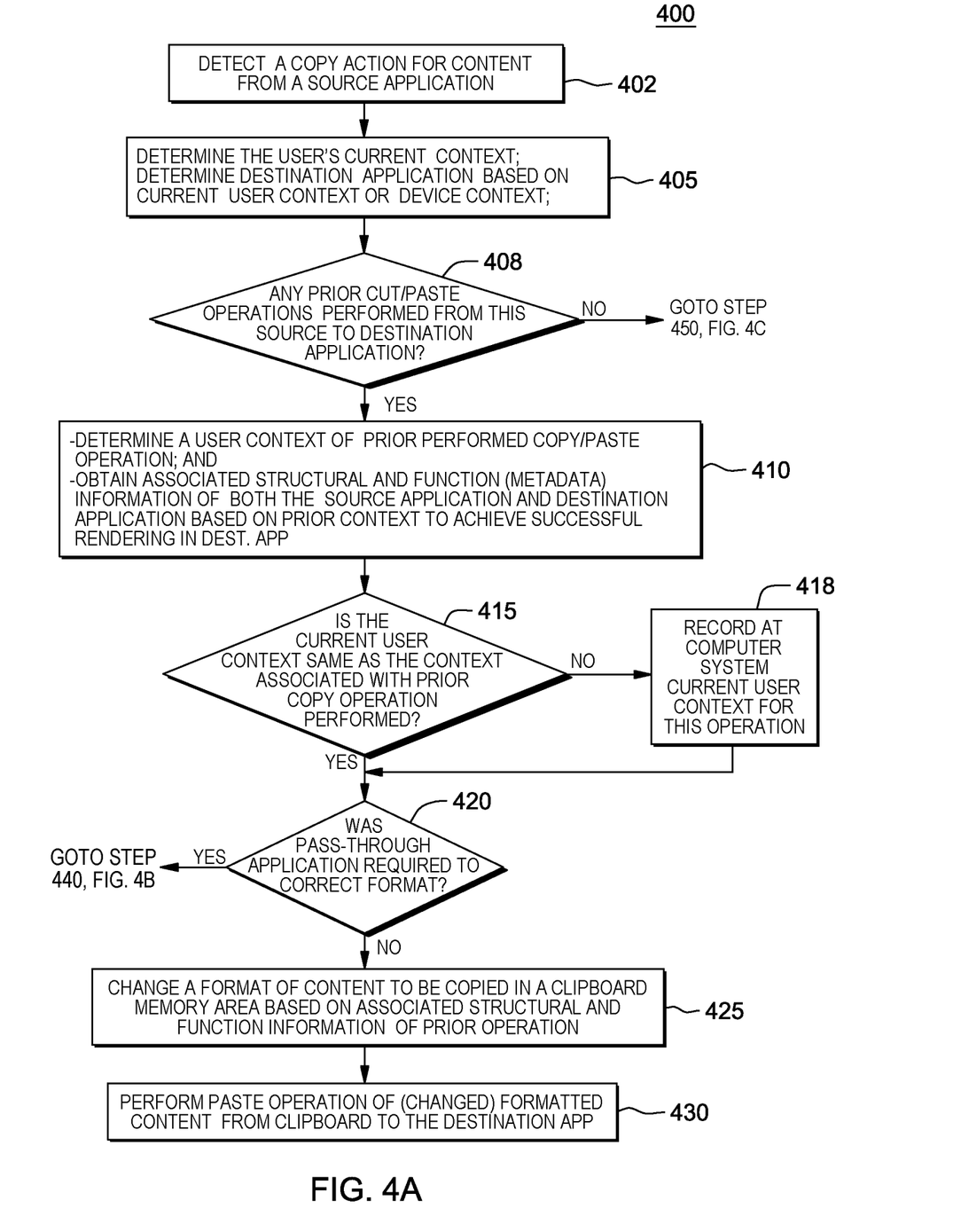
FIGS. 4A-4F depict a method run at a computer system for performing cognitive copy-paste/cut-paste operations according to one embodiment.

The method may further utilize historical information, e.g., stored in a database, to determine for the determined source application and destination application whether the format in the target application would result in undesirable formatting. If so, the methods will search for a third application, e.g., pass-through application, that is known Once the destination application is determined, further, at 408, a determination may be made whether that user has a use history of past copy/cut/paste operations involving these detected source and target applications. If no prior copy/paste operations have been detected between these source and target applications, the process proceeds to step 450, FIG. 4C. Otherwise, if it is detected that prior cut/paste operations have been performed from this source to destination application, then the process proceeds to 410 where there may be further determination of a past user context when performing prior copy/paste operations between these two applications. At 410, the cognitive monitor may further obtain associated structural and functional (metadata) information (i.e., trace data) relating to respective utilities of both the source application and destination application programs that may be used to ensure whether formatting would be preserved, or whether good rendering is achievable in the destination application based on historical activity. Alternatively, or in addition, the cognitive monitor may determine one or more likely formatting changes from a history file containing formatting changes previously made when copying content from the source application to the particular destination application. In one embodiment, the determining one or more likely formatting changes from a history file containing formatting changes previously made when copying content from the source application to the target application may employ the support vector machine and supervised learning techniques.

As an example, based on historical user context and stored user preferences, memorialized in a Support Vector Machine implementation, it may be determined that for a particular copy/paste use, a majority of the time, the user intended copying contents formatted as a "table" from a source application to render it as a "bullet list" format in a destination application. Thus, from the historical file, this user context (formatting preference) may be determined, and the method will automatically invoke a sequence of the functional utilities and steps (i.e., trace activity) required to convert the table format to a bullet list format to ensure this type of rendering for this user context. Alternatively, based on the user context, there may be determined a type of pass-through application that has been determined that best maps content in table form to render it in bullet list form for use in the destination application.

As a further user context example, it may be determined from historical usage that a user may format live "links" differently than formatting stub links; Meta-data for the content from the originator source program could be used to derive formatting for the content on the consumer. Channels for pasting content to one application could be driven by pasting that content in from another application. As an example, a user first copies a web address (URL) into a source code editor application, e.g., Notepad, and then copies and pastes the content into Microsoft Word to insert the space in a URL (" ") as "%" or "%20" which only happens in Notepad. Additionally, time-sensitive data could be analyzed and converted to make sense for future applications. For example, it may be determined that the user may always formats pasted content indicating a text word "Today" into a formatted alpha-numeric date and/or time-stamp in a destination application.

It is understood that from historical usage of other users, e.g. a group of users that the user may know or work with, the sequence of formatting steps may be further determined. That is, a user's intent may be alternatively determined based on the recorded context of other users who have copied/pasted contents between these same two source/destination applications in the past.

Continuing at 415, a further determination may be seamlessly made as to whether the current user context is the same as the context associated with the prior (past) copy operation performed. If the current user context is not the same as the context associated with the prior (past) copy operation performed, then at 418 the cognitive monitor records the current user context for this operation at the computer system and the process proceeds to 420. Otherwise, if it is determined that the current user context is the same as the context associated with the prior (past) copy operation performed, the process proceeds directly to 420 where a further determination is made as to whether an intermediate, pass-through application had been required to first receive the copied/cut content and correct the format prior to pasting the content to the destination application. If a pass-through application was required, then the process proceeds to step 440, FIG. 4B. Otherwise, having determined that the user context was similar to past context and based on the user's past copy/paste operations between these applications without use of a pass-through application to achieve a best rendering in the destination application, the process proceeds to 425 where the format of the content to be pasted is changed, e.g., in a clipboard memory area, based on associated structural and function information of prior operation. Then, at 430, the method performs the paste operation of the formatted content from the clipboard memory for rendering at a location within the destination application, e.g., an e-mail message, a chat window, another editor, etc.

At steps 425, 430, the modifying of the content to best render the content is thus based on one or more of: (a) the determined intended user of the first portion of content, (b) the determined utilities associated with the source and target application programs, and (c) any determined likely formatting changes. As an example, the methods invoked may modify the first portion of content to generate the rendered version in the second destination application based on the metadata.

As a further example, for the case where the content from a source application includes a time noun phrase (e.g., today, this week, the afternoon) that implies but does not define a calendar time phrase format (e.g., December 1, 2016, 12/04/2016-12/11/2016, 4:30 PM), and from the context, it is determined that the rendered content in the destination application is a calendar time entry corresponding with the time noun phrase, the method may further invoke steps of replacing the time noun phrase with the calendar time phrase in the destination application.

Figure 4B:
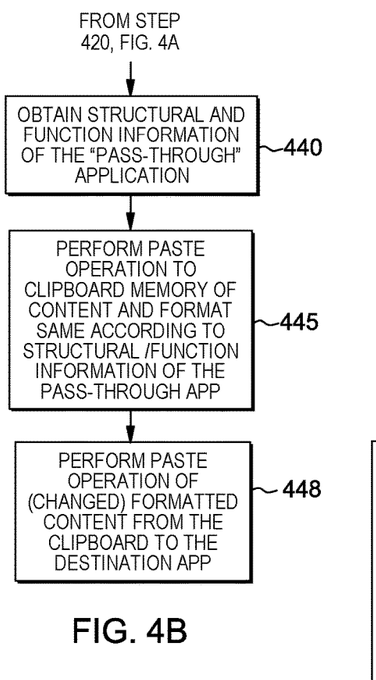

Returning back to 420, FIG. 4A, if it is determined that there was a pass-through operation required to first correct the format of the copied/cut content, the method proceeds to step 440, FIG. 4B, where the cognitive monitor obtains structural and functional information of the "pass-through" application, and at 445, seamless to the user, performs the paste operation of content first to clipboard memory and formats the content according to the structural/function information of the pass-through application.

Then, at 448, FIG. 4B, the system performs the paste operation of the (changed) formatted content from the clipboard to the location opened within the destination application.

Figure 4C:
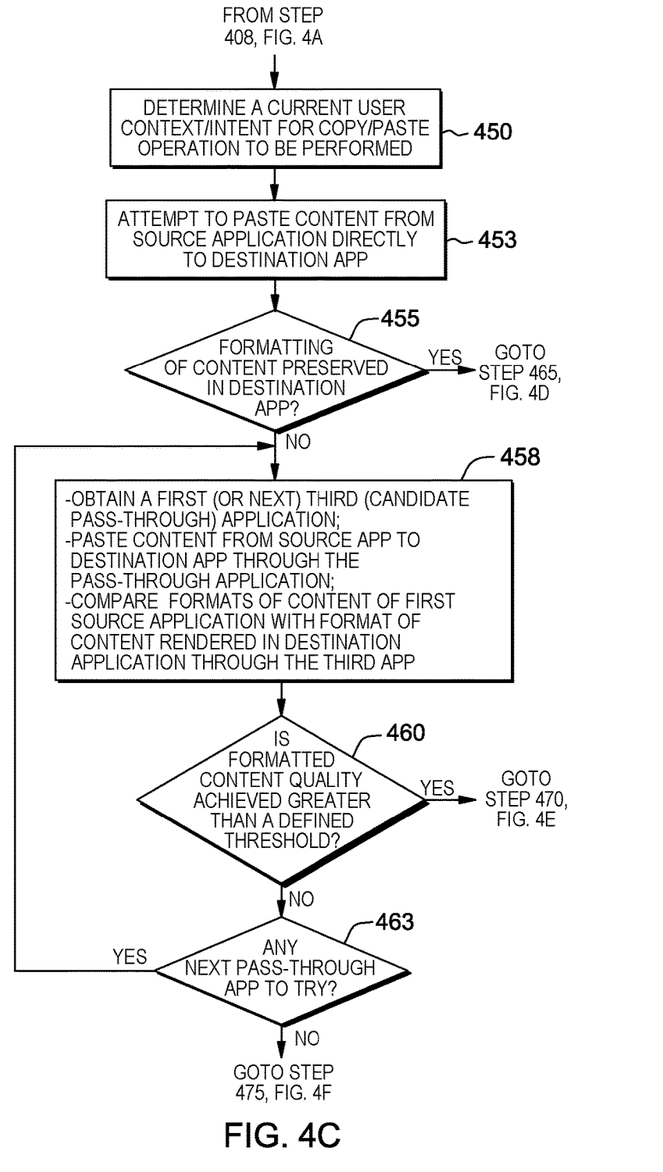
Figure 4D:
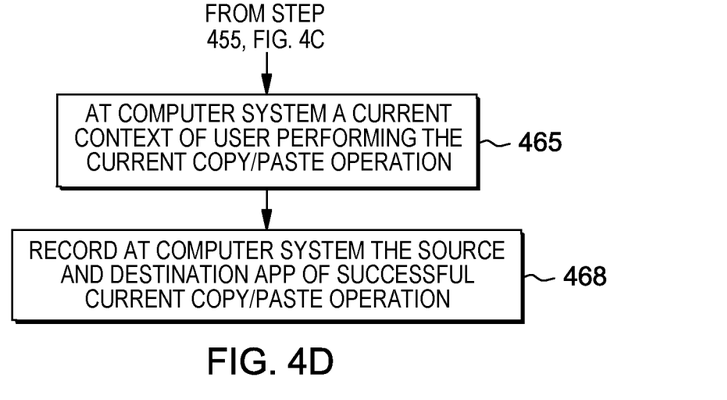

Returning back to 408, FIG. 4A, if it is determined that no prior cut/paste operations have been performed by this user from this source to destination application, the method proceeds to step 450, FIG. 4C, where the cognitive monitor determines a current user context/intent for the copy/paste operation to be performed and at 453, attempts to paste content from source application directly to the location in the destination application. In one embodiment, this attempted rendering may be performed seamless to the user; alternatively, based on the trace metadata information, the monitor may automatically determine that a rendering incompatibility may exist when content is to be transferred between these identified source/destination applications. Thus, at 455, a determination is made as to whether formatting of content can be preserved in the destination application. If it is determined that the correct formatting of the copied/cut content may be preserved to an acceptable degree in the destination application, then the process proceeds to step 465, FIG. 4D where the cognitive monitor records at the computer system, the current context of user performing the current copy/paste operation, and at 468, FIG. 4D, further records that this combination of the current source and destination applications may successfully render content of the copy/paste operations.

Otherwise, returning to 455, FIG. 4C, if it is determined that the correct formatting of the copied/cut content would not be preserved to an acceptable degree in the destination application, then the process proceeds to step 458, FIG. 4C where the cognitive monitor may iteratively determine whether a particular pass-through application may exist that can be used to achieve an acceptable rendering of the content to the destination application.

In particular at 458, in a manner seamless to the user, the method may obtain a first (or next) candidate pass-through application and, via use of clipboard memory, attempt to paste content from the source application to the destination via the formatting engendered by the candidate pass-through application. The monitor may then record whether that first (or next) candidate pass-through application "best" preserves the content format when the content is pasted from the pass-through application to a location within the destination application. For example, if the copied/cut content includes a URL, in one embodiment, the method may perform validating the rendered content by testing the URL in a web browser. That is, Internet connectivity can be used to validate if a website link is in fact a website which may help provide additional context for how a user is using the content.

The step 458 may further include, in a manner seamless to the use, further steps of: pasting of the selected source content from source application into a third candidate pass-through application, e.g., App 1, App 2, . . . , App N, and render the source content in the third (candidate pass-through) application program. Then, the method subsequently performs copying the content rendered within the third application program and pasting the content into the destination (target) application program. The method then compares the formatting of the first source content as rendered by the source application program with a formatting of the content that results in the destination application after rendering by the third (candidate pass-through) application program. If it is determined that the formatting is the same, i.e., as close to achieving a threshold value, then the third pass-through application becomes the pass-through application that best renders the source contents in the destination application.

As an example, based on comparisons at step 458, it may be determined that a hyperlink or URL embedded in the selected content of a source word processing program when first pasted into a "chat" window of a candidate pass-through application may first "fix" the existence of spaces (e.g., by adding % instead of spaces). Based on this, the candidate pass-through application ("chat" window) may be determined as the best to render the contents in the destination application. The content having links or URLs may then be copied from the chat window (of the pass-through application) and then pasted from chat into the destination application program (e.g., an email program) where they are rendered operable.

The process may then proceed to 460, where a determination is made, based on the comparison at step 458, whether a quality of the formatted content is greater than a pre-defined threshold, i.e., determine whether a degree and/or quality of the rendering in the destination application "best" preserves the original content format in the destination application.

If it is determined at 460 that the first candidate pass-through application does not achieve a destination application rendering quality greater than the threshold, then the process proceeds to step 463 where a next candidate pass-through application is seamlessly opened and the process returns to 458 to paste the content in this new candidate pass-through application to determine whether the content format may be preserved in the destination application by achieving or exceeding the rendering quality threshold at 460. The candidate pass-through applications may be one or more applications 385 capable of running on the computer system.

Thus, in one embodiment, the method iterates through steps 458, 460 and 463 until a candidate intermediate pass-through application is determined that achieves an acceptable degree of rendering quality in a destination application when content from that source application is copied/pasted to the destination application. In one embodiment, the iterated candidate pass-through applications may be prioritized or ranked, based on the quality of the rendering formats within the destination application rendered prior via the respective candidate pass-through application.

Figure 4E:
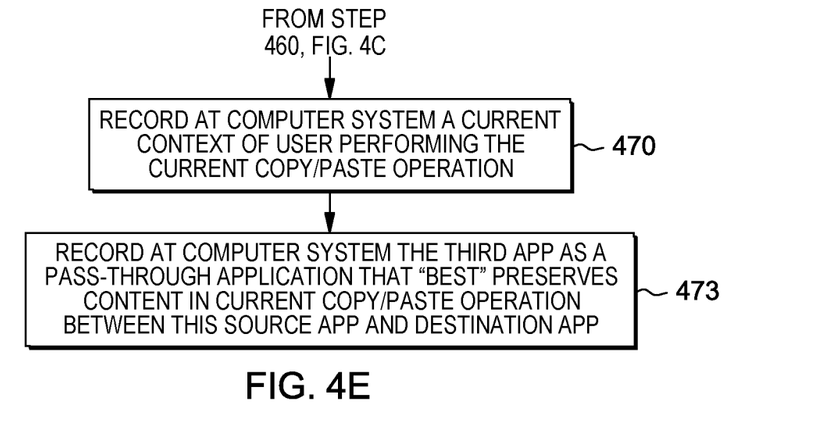

Returning to 460, FIG. 4C, in one embodiment, once a best candidate pass-through application is determined that could achieve a rendering of content at the destination application to an acceptable degree or rendering quality, the process will proceed to step 470, FIG. 4E where the cognitive monitor may record at computer system the current context of user performing the current copy/paste operation, and further, at 473, record, based on the comparison results, that the third application is the pass-through application and associated metadata that "best" preserves content for this current intended copy/paste operation between the both the current source application and target destination applications.

Figure 4F:
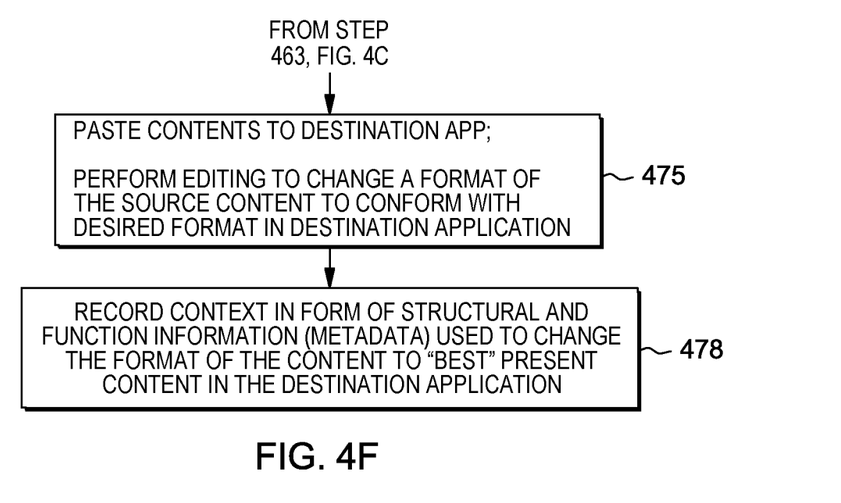

Returning to 463, FIG. 4C, in one embodiment, if it is determined that not one candidate pass-through application may achieve the best rendering or achieve the threshold, and that there is no more candidate pass-through applications to try, the process proceeds to step 475, FIG. 4F, where the selected contents of the source application are pasted to the destination application, so that the user may manually perform editing to change a format of the pasted source content to conform with desired format in destination application. The editing operations that the user undertakes in rendering the pasted format as acceptable in the destination application are recorded at 478, FIG. 4D, and particularly recorded as user context in the form of structural and function information (Metadata) associated with those user operations invoked to change the format of the content that "best" presents the content in the destination application.

Figure 5:
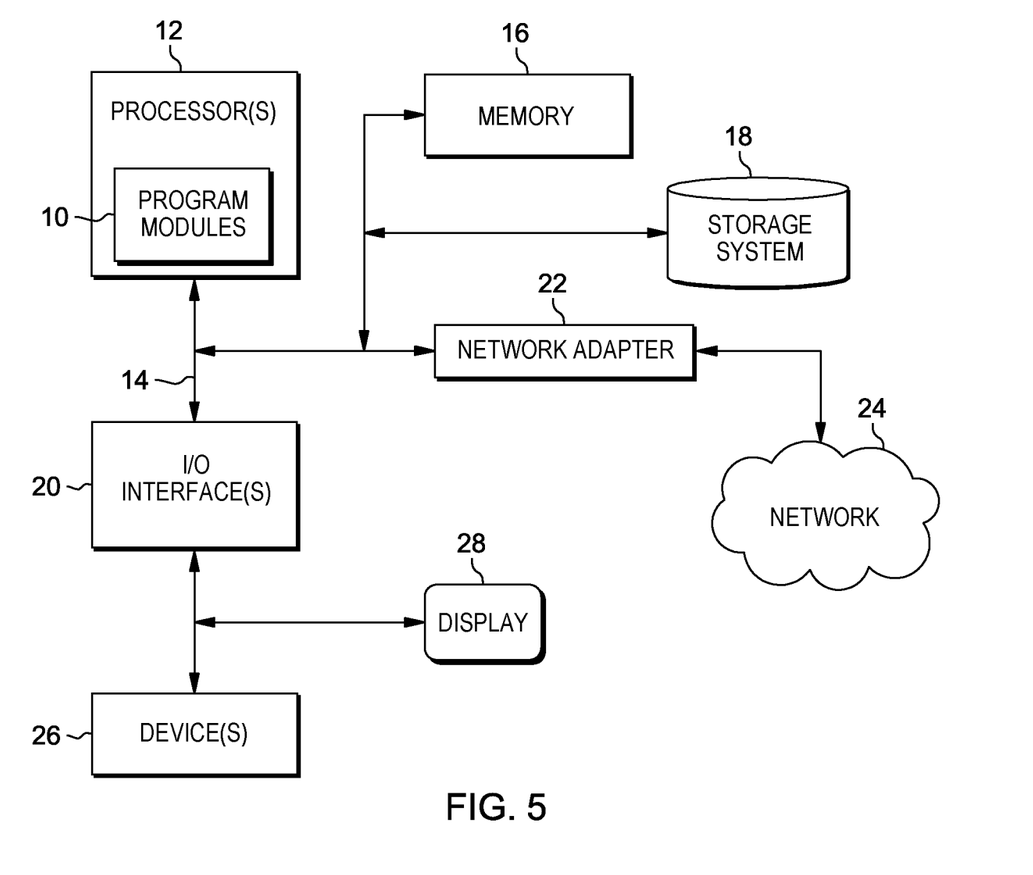
FIG. 5 illustrates an example computing system in accordance with an embodiment.

FIG. 5 illustrates an example computing system in accordance with the present invention that may provide the services and functions associated with cognitive copy and paste operations. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 3 and 4A-4F.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method comprising:
   receiving, at a hardware processor of a computer system, an input representing a user selection of a text content including hyperlinks captured from a display using a source application program running on the computer system;
   receiving, at the hardware processor, a second input representing an identified destination application program that will receive the selected content to be copied and rendered in said destination application program, said destination application program unable to preserve an original format of the selected text content and hyperlinks when directly rendering the selected content on the display;
   analyzing, by said processor device, the selected content;
   determining, by said processor device, a context for the selected content;
   selecting a formatting change for rendering said selected content based on said determined context, said formatting change selected from a history of previous content formatting changes previously made when prior copying other content from the source application and rendering it for display using the destination application;
   determining utilities associated with the source and identified destination application programs involving said selected formatting change; and
   applying one or more of said determined utilities to render, by the hardware processor, the selected content at a location within the identified destination application based on said determined context, said one or more determined utilities preserving the original format of said selected text content and hyperlinks to achieve a best representation of said selected content on said identified destination application.

2. The computer-implemented method as claimed in claim 1, wherein said selected content includes text, said determining a context of a selected content comprising:
   invoking operations of a natural language processor to analyze said selected content at a location near said selected content.

3. The computer-implemented method as claimed in claim 2, wherein said determining a context determining of a selected content further comprises:
   invoking operations of a natural language processor to determine an intent or meaning of the selected content, or an intended use of the selected content based on the determined context and the determined intent of the content.

4. The computer-implemented method as claimed in claim 1, further comprising:
   invoking by said processor device, operations to obtain from a memory storage device, data representing the selected formatting change for said selected content based on said determined context.

5. The method of claim 1, wherein a formatting change is selected based on one or more of:
   a) the determined intended use of the selected content,
   b) the determined utilities associated with the source and identified destination application programs, and
   c) a determined likelihood of using a particular formatting change from said history of formatting changes.

6. The method of claim 1, wherein the selected content is associated with metadata, said method further comprising: modifying the selected content for rendering within said identified destination application program based on the metadata.

7. The method of claim 1, wherein the selected content includes a time noun phrase for implying but not defining a distinct calendar time phrase, said method further comprising: replacing, using the processor device, the time noun phrase with the calendar time phrase when rendering said selected content to said location within said identified destination application.

8. The method of claim 1, wherein prior to rendering, by the hardware processor further, said method further comprising:
   determining, by said processor device, that the selected content to be rendered within said identified destination application program will not match the rendering of the selected content from said source application program; and
   invoking operations at said hardware processor for determining whether there is a pass-through application program available for rendering, and
   responsive to determining that a pass-through application is available, first pasting selected content from said source application program to the pass-through application for first rendering the selected content in the candidate pass-through application program.

9. The method of claim 8, wherein said operations for determining whether there is a pass-through application program available for rendering further comprises:
   a) selecting and activating a candidate pass-through application program on said computer system;
   b) pasting the selected content into the selected candidate pass-through application and rendering the selected content in the candidate pass-through application program;
   c) subsequently copying the rendered selected content from the candidate pass-through application program and pasting the selected content from the candidate pass-through application into the location at the identified destination application program;
   d) rendering the selected content in the destination application program;
   e) determining a measure of similarity between a format of the copied selected content as rendered in the source application program with format of the selected content as rendered by the identified destination application program copied from said candidate pass-through application program;

f) repeating said steps a) through e) for each of additional candidate pass-through application program; and g) determining said pass-through application program as a candidate pass-through application program having a highest similarity measure.

10. The method of claim 9, wherein said step e. of determining a measure of similarity measure comprises:

comparing said format similarity measure against a predefined threshold value; and ranking each of said candidate pass-through application programs according to said similarity measure comparing.

11. The method of claim 1, wherein said selected content includes a hyperlink comprising a uniform resource locator (URL), said method further comprising: prior to said rendering, activating a web browser application and validating the selected content by testing the URL in a web browser.

12. The method of claim 7, further comprising:

employing, by the hardware processor, supervised learning techniques for building a support vector machine (SVM) model for determining content formatting changes based on said history of previously made content formatting changes when copying content from the source application to the destination application; and employing said SVM model for determining a likely formatting change based on the selected content and said determined context.

13. A computer-implemented cognitive content copy and paste system comprising:

a memory storage device; and a hardware processor coupled to said memory storage device and configured to perform a method to:

receive an input representing a user selection of a text content including hyperlinks captured from a display using a source application program running on a computer system;

receive a second input representing an identified destination application program that will receive the selected content to be copied and rendered in said destination application program, said destination application program unable to preserve an original format of the selected text content and hyperlinks when directly rendering the selected content on the display;

analyze the selected content to determine a context for the selected content;

select a formatting change for rendering said selected content based on said determined context, said formatting change selected from a history of previous content formatting changes previously made when prior copying other content from the source application to the destination application;

determine utilities associated with the source and identified destination application programs involving said selected formatting change; and apply one or more of said determined utilities to render the selected content at a location within the identified destination application according to the formatting change based on said determined context, said one or more determined utilities preserving the original format of said selected text content and hyperlinks for achieving a best representation of said selected content on said identified destination application.

14. The system of claim 13, further comprising:

a natural language processor configured for determining said context of a selected content, said context comprising one or more of: an intent or meaning of the selected content, or an intended use of the selected content.

15. The system of claim 14, wherein said hardware processor is further configured to:

invoke operations to obtain from a memory storage device, data representing the selected formatting change for said selected content based on said determined context.

16. The system of claim 13, wherein prior to said rendering, said the hardware processor is further configured to:

determine that the selected content to be rendered within said identified destination application program will not match the rendering of the selected content from said source application program;

invoke operations for determining whether there is a pass-through application program available for rendering, and responsive to determining that a pass-through application is available, first pasting selected content from said source application program to the pass-through application for first rendering the selected content in the candidate pass-through application program.

17. A computer readable medium comprising instructions that, when executed by at least one processor comprising hardware, configure the at least one processor to:

receive an input representing a user selection of a text content including hyperlinks captured from a display using a source application program running on a computer system;

receive a second input representing an identified destination application program that will receive the selected content to be copied and rendered in said destination application program, said destination application program unable to preserve an original format of the selected text content and hyperlinks when directly rendering the selected content on the display;

analyze the selected content;

determine a context for the selected content;

select a formatting change to render said selected content based on said determined context, said formatting change selected from a history of previous content formatting changes previously made when prior copying other content from the source application to the destination application;

determine utilities associated with the source and said identified destination application programs involving said selected formatting change; and apply one or more of said determined utilities to render the selected content at a location within the identified destination application based on said determined context, said one or more determined utilities preserving the original format of said selected text content and hyperlinks for achieving a best representation of said selected content on said identified destination application.

18. The computer readable medium according to claim 17, wherein said instructions further comprise instructions to:

invoke a natural language processor to determine said context of a selected content, said context comprising one or more of: an intent or meaning of the selected content, or an intended use of the selected content.

19. The computer readable medium according to claim 17, wherein said instructions further comprise instructions to:
invoke operations at said hardware processor to obtain from a memory storage device, data representing the selected formatting change for said selected content based on said determined context.

20. The computer readable medium according to claim 17, wherein said instructions further comprise instructions to:
determine that the selected content to be rendered within said identified destination application program will not match the rendering of the selected content from said source application program;
invoke operations for determining whether there is a pass-through application program available for rendering, and
responsive to determining that a pass-through application is available, first pasting selected content from said source application program to the pass-through application for first rendering the selected content in the candidate pass-through application program.

* * * * *